US010104612B2

(12) United States Patent
Chou et al.

(10) Patent No.: US 10,104,612 B2
(45) Date of Patent: Oct. 16, 2018

(54) UE PREFERENCE INDICATION AND ASSISTANCE INFORMATION IN MOBILE COMMUNICATION NETWORKS

(71) Applicant: MEDIATEK, INC., Hsin-Chu (TW)

(72) Inventors: Chie-Ming Chou, Taichung (TW); Chia-Chun Hsu, New Taipei (TW); Per Johan Mikael Johansson, Kungsangen (SE)

(73) Assignee: HFI Innovation Inc., Hsin-Chu County (TW)

( * ) Notice: Subject to any disclaimer, the term of this patent is extended or adjusted under 35 U.S.C. 154(b) by 74 days.

(21) Appl. No.: 13/959,755

(22) Filed: Aug. 6, 2013

(65) Prior Publication Data
US 2014/0044029 A1 Feb. 13, 2014

Related U.S. Application Data

(60) Provisional application No. 61/680,358, filed on Aug. 7, 2012.

(51) Int. Cl.
*H04W 52/02* (2009.01)

(52) U.S. Cl.
CPC ... *H04W 52/0212* (2013.01); *H04W 52/0216* (2013.01); *H04W 52/0254* (2013.01);
(Continued)

(58) Field of Classification Search
CPC ......... H04W 52/0212; H04W 52/0209; H04W 76/021; H04W 76/028
See application file for complete search history.

(56) References Cited

U.S. PATENT DOCUMENTS

| 2007/0026887 A1 | 2/2007 | Voyer et al. ............ 455/525 |
| 2010/0113019 A1 | 5/2010 | Jeong et al. ........... 455/435.2 |

(Continued)

FOREIGN PATENT DOCUMENTS

| CN | 1905720 A | 7/2005 |
| CN | 101925148 A | 6/2009 |

(Continued)

OTHER PUBLICATIONS

International Search Report and Written Opinion of International Search Authority for PCT/CN2013/080989 dated Nov. 21, 2013 (10 pages).

(Continued)

*Primary Examiner* — Anh-Vu Ly
*Assistant Examiner* — Hector Reyes Ortiz
(74) *Attorney, Agent, or Firm* — Imperium Patent Works; Zheng Jin; Helen Mao

(57) ABSTRACT

A method and apparatus for UE to report preference indication and other UE assistance information to the network is proposed. In a first embodiment, the UE transmits a power preference indication to the network with a prohibition mechanism for optimal DRX configuration. A first level of prohibition is applied if the UE indicates preferring power-saving mode, and a second level of prohibition is applied if the UE indicates preferring normal mode. In a second embodiment, the UE transmits two-level speed information to the network. The two-level speed information is mapped from MSE mobility states based on a mapping rule. In a third example, the UE transmits RRC release assistance information to the network. The assistance information is based on both cell change count and RRC state transition count so that RRC inactivity time can be determined to reduce signaling overhead.

14 Claims, 7 Drawing Sheets

(52) U.S. Cl.
CPC ............ *Y02D 70/00* (2018.01); *Y02D 70/122* (2018.01); *Y02D 70/124* (2018.01); *Y02D 70/1262* (2018.01); *Y02D 70/24* (2018.01); *Y02D 70/25* (2018.01)

(56) References Cited

U.S. PATENT DOCUMENTS

| | | | |
|---|---|---|---|
| 2011/0261739 A1* | 10/2011 | Fong et al. | 370/311 |
| 2012/0088509 A1 | 4/2012 | Yi | 455/437 |
| 2012/0100864 A1 | 4/2012 | Susitaival et al. | 455/450 |
| 2012/0201219 A1 | 8/2012 | Wager et al. | 370/329 |
| 2012/0224552 A1 | 9/2012 | Feuersanger et al. | 370/329 |
| 2013/0215788 A1* | 8/2013 | He et al. | 370/253 |
| 2013/0329576 A1* | 12/2013 | Sinha | 370/252 |
| 2014/0018085 A1* | 1/2014 | Young | H04W 52/0235 455/450 |
| 2014/0022974 A1* | 1/2014 | Eriksson et al. | 370/311 |
| 2014/0036748 A1* | 2/2014 | Mukherjee et al. | 370/311 |
| 2014/0036750 A1* | 2/2014 | Yavuz | H04W 52/0216 370/311 |
| 2014/0036794 A1* | 2/2014 | Koc et al. | 370/329 |
| 2014/0038579 A1* | 2/2014 | Henttonen et al. | 455/418 |
| 2015/0201375 A1* | 7/2015 | Vannithamby | H04W 24/04 370/311 |

FOREIGN PATENT DOCUMENTS

| | | |
|---|---|---|
| CN | 101925161 A | 6/2009 |
| CN | 102026326 A | 9/2009 |
| CN | 102625421 A | 1/2011 |
| EP | 2317815 A1 | 11/2009 |
| EP | 2360962 | 2/2010 |
| WO | WO2011043709 A1 | 10/2009 |

OTHER PUBLICATIONS

3GPP TSG RAN WG2 Meeting #76 R2-115919; Huawei; Need of Mobility State Estimation Enhancement in HetNet; Nov. 14-18, 2011; San Francisco, USA (5 pages).

EPO, Search Report for the EP patent application 15175026.2 dated Oct. 5, 2015 (9 pages).

3GPP TS 36.331 V8.5.0 (Mar. 2009), 3rd Generation Partnership Project; Technical Specification Group Radio Access Network; Evolved Universal terrestrial radio Access (E-UTRA) Radio Resource Control (RRC); Protocol Specification (Release 8); pp. 95-125.

EPO, Search Report for the EP patent application 15175031.2 dated Oct. 5, 2015 (8 pages).

EPO, Search Report for the EP patent application 13827305.7 dated Mar. 21, 2016 (7 pages).

SIPO, Office Action for the CN patent application 201380009406.X (no English translation is available) dated Apr. 17, 2017 (6 pages).

* cited by examiner

UE PREFERENCE INDICATION AND ASSISTANCE INFORMATION IN MOBILE COMMUNICATION NETWORKS

CROSS REFERENCE TO RELATED APPLICATIONS

This application claims priority under 35 U.S.C. § 119 from U.S. Provisional Application No. 61/680,358, entitled "UE Preference Indication," filed on Aug. 7, 2012, the subject matter of which is incorporated herein by reference.

TECHNICAL FIELD

The disclosed embodiments relate generally to mobile communication networks, and, more particularly, to UE preference indication and providing other assistance information to the network.

BACKGROUND

When smart-phones came in the market, mainly when the "iPhone" was first launched, real always-on service was used for the first time in cellular networks. This has created a number of issues. First, many always-on applications generate frequent traffic, e.g. for keep alive messages and status updates, which bring significant problems. Second, the signaling in the network increases a lot due to frequency context establishment and release, e.g. for RRC Connected—RRC IDLE transition. In many networks, this becomes a severe dimensioning problem for the whole network. Third, the UEs battery life is short. Fourth, for devices that generate always-on sparse traffic, the overhead is very large related to the data payload transmission.

In 3GPP LTE/LTE-A systems, DRX mechanism is adopted to support sleep mode while there is no data transmission during RRC Connected state. It is observed that DRX might have a trade-off between data latency and UE power consumption. For example, using long DRX may have low power consumption but increase the latency. In addition, services in smart-phones may be categorized into background traffic and interactive traffic that would have respective requirements. As a result, switching on the DRX configurations for different traffic is expected to be beneficial. To support the feature, UE needs to indicate its performance preference (depended on its running applications, user behavior, and hardware operations) to eNB for configuring DRX appropriately.

Until now, 3GPP has agreed to introduce signaling from the UE to the network that allows the UE to toggle between a "default" state and a "lower power consumption" state, where it is up to the network on whether and how to make use of the preference indication from the UE. For UE preference reporting, the main problem may be excessive reporting when UE wants a fast adapting DRX. Since the decisions and configurations of DRX is controlled by eNB and the DRX state-switching aspect may be different from UE and eNB point of view, eNB needs a control mechanism to avoid frequent reporting. In addition, due to UE mobility, eNB needs to specify whether the preference reporting shall be reported again after HO or eNB shall negotiate on the information.

Besides power saving preference, another useful information is speed information. For UE speed information, how to represent the information to eNB is the problem. Although an accurate value (e.g., physical speed) could provide more information, it also increases the reporting overhead and demands more sophisticated algorithm at the network side. How useful is the speed information really depends on the network algorithm, which decides the speed information shall be provided in certain representation (e.g. granularity, etc.). In addition, mechanisms are also needed to control excessive reporting to reduce signaling overhead.

One objective for UE to report speed information is to assist eNB to decide whether it is better to keep the UE in RRC Connected longer or release the UE to RRC IDLE shortly after buffer becomes empty. In other words, to assist eNB to decide the length of the RRC inactivity timer that is used to control how long the UE will be released to RRC IDLE after the belonged buffer is empty. With speed information, eNB could consequently apply proper RRC inactivity timer for the UE and save the signaling overhead due to the avoidance of frequent handover by releasing UE to IDLE. That is, the UE will perform cell reselection instead of handover to deal with its mobility and that cell reselection does not introduce any signaling. Such signaling overhead is apparently related to UE speed. However, if UE only reports its mobility state, eNB might not be able to decide a proper RRC inactivity timer since it has no clue on the history of state transition of the UE. For example, when a UE report its speed is high, the eNB might release it to IDLE quickly after empty buffer (HO signaling is more than cell reselection). However, if the UE has history of frequent transition, a better decision is to keep the UE in connected mode (HO signaling is less than RRC connection establishment signaling). Therefore, it is insufficient to decide the RRC inactivity timer based on speed information only.

A solution is sought.

SUMMARY

A method and apparatus for UE to report preference indication and other UE assistance information to the network is proposed.

In a first embodiment, the UE transmits a power preference indication to the network with a prohibition mechanism for optimal DRX parameter decision. A first level of prohibition is applied (e.g., a longer prohibit timer) if the UE indicates preferring power-saving mode, and a second level of prohibition is applied (e.g., a shorter prohibit timer) if the UE indicates preferring normal mode. In one specific example, the shorter prohibit timer is zero (0), so that the UE is not prohibited for indicating normal mode preference.

In a second embodiment, the UE transmits two-level speed information to the network. The UE determines the two-level speed information based on MSE performed by the UE based on HO and cell reselection counts. In one example, the MSE categorizes UE speed into normal, medium, and high three mobility states, and the UE maps the three mobility states into normal and high two-level speed information based on a mapping rule.

In a third embodiment, the UE transmits RRC release assistance information to the network. The assistance information is based on both cell count and RRC state transition count so that RRC inactivity time can be determined to reduce overall signaling overhead. In a first example, the assistance information comprises both the cell count and the RRC state transition count, so that eNB decides on whether to keep the UE in RRC Connected to release the UE to IDLE based on both counts. In a second example, the UE makes evaluation based on both counts, and the assistance information comprises a one-bit overhead indication on whether to keep the UE in RRC Connected or release the UE to IDLE.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
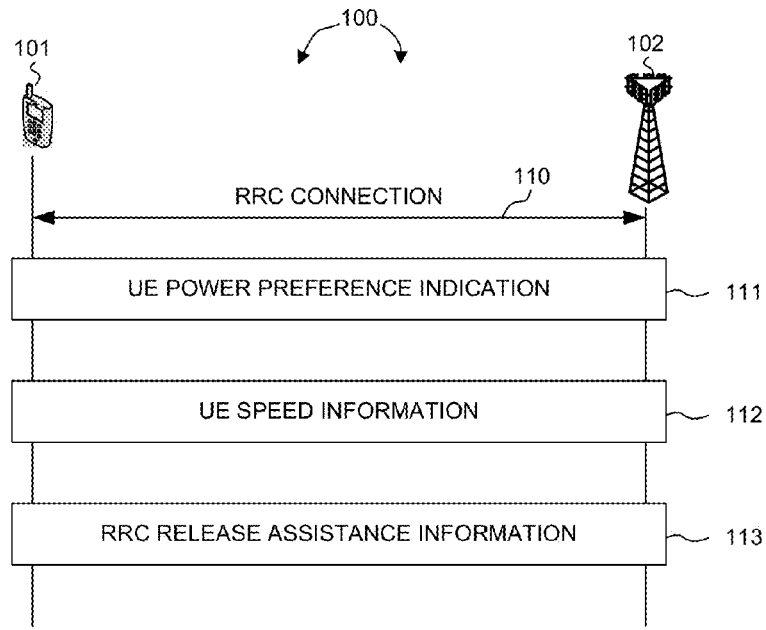
FIG. 1 illustrates a system diagram of a wireless network supporting UE preference indication and assistance information in accordance with a novel aspect.

FIG. 1 illustrates a system diagram of a mobile communication network 100 supporting UE preference indication and other UE assistance information in accordance with a novel aspect. In 2G and 3G networks, UE uses discontinuous reception (DRX) in IDLE state to increase battery life. LTE system has introduced DRX in Connected state. Long DRX in RRC Connected state helps to improve battery life. However, DRX has a trade-off between data latency and UE power consumption. First, UE needs to indicate its power preference to the eNB and eNB could switch the DRX (power-saving mode ←→ normal mode) appropriately. Second, configuring long DRX for high speed UE may raise frequent radio link failure (RLF) since there is no sufficient time for measurement. Consequently, 3GPP has agreed to have preference and speed information sent from the UE to the mobile communication network.

The preference and speed information may be based on plain internal UE state information, i.e. it is not necessarily a "preference", but just a piece of information to assist the network. The most important aspect of the signaled "preference" is that together with other information available in the eNB, the eNB can use the preference to detect situations when eNB can apply a configuration more optimized towards power saving, i.e. not necessarily fulfilling QoS objectives. For example, while UE is indicating preference for power saving and the transmitted data volumes are small, the network could interpret that this is only background traffic of always-on applications (such as Skype, MSN messenger, Facebook or other buddy-list applications) that can be served with relaxed QoS and enhanced power saving.

If the data volumes are large, but UE is still indicating a preference for power saving, this could be an indication that the mobile user is doing background downloads, and the network should probably follow QoS objectives in order to not disturb the download protocol, e.g. FTP/TCP.

In one novel aspect, UE indicates to the network its preference and other assistance information to help the network to make optimal configurations on DRX and physical layer configuration, to release UE to IDLE mode at proper time, and to manage UE mobility efficiently. In addition, such indication is provided to the network only at times when it is useful to avoid frequent reporting. As illustrated in FIG. 1, mobile communication network 100 comprises a user equipment UE 101 and a base station eNB 102. In step 110, UE 101 establishes an RRC connection with eNB 102. Different mechanisms are proposed for UE 101 to report its indication to eNB 102 such that RRC parameters can be tuned correctly and efficiently, and that better power saving could be achieved without violating QoS requirements. In step 111, UE 101 reports power preference indication to eNB 102 with a prohibition mechanism. The parameters to control the rate or time of the reporting can be different for UE in normal mode and in power-saving mode. In step 112, UE 101 performs MSE mapping and reports speed information to eNB 102. The two-level speed information is sufficient to justify whether DRX cycle and RRC inactivity timer could be extended. In step 113, UE 101 records both cell change counts and RRC state transition counts and reports corresponding RRC release assistance information to eNB 102. Besides speed information (e.g., based on cell change counts), the assistance information is also important to reflect overall signaling overhead and thus helps eNB to determine whether a long RRC inactivity time is preferred or not. Note that FIG. 1 illustrates that, there is a sequence of UE power preference indication, UE speed information and RRC release assistance information. However, the invention does not limit the reporting sequence for those three indications. Any of the UE information could be reported simultaneously or in any sequence to the network.

Figure 2:
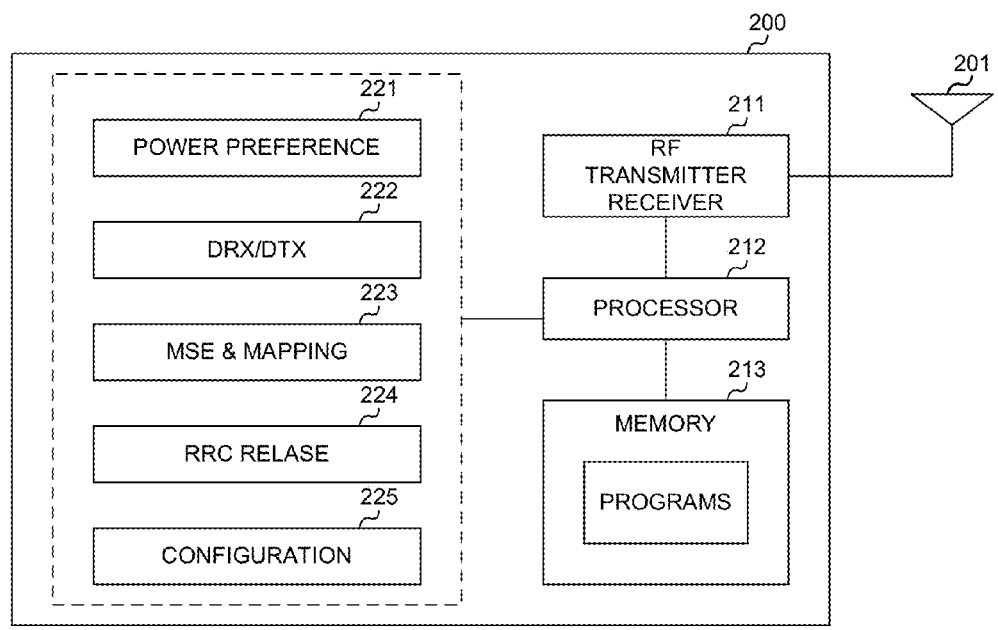
FIG. 2 is a simplified block diagram of a UE in accordance with embodiments of the current invention.

FIG. 2 is a simplified block diagram of a UE 201 in accordance with embodiments of the current invention. The UE has RF transceiver module 211, coupled with antenna 201 receives RF signals from antenna 201, converts them to baseband signals and sends them to processor 212. RF transceiver 211 also converts received baseband signals from the processor 212, converts them to RF signals, and sends out to antenna 201. Processor 212 processes the received baseband signals and invokes different functional modules to perform features in the UE. Memory 213 stores program instructions and data to control the operations of the UE. FIG. 2 further illustrates five functional modules 221 to 225 in the UE that carry out embodiments of the current invention. The functional modules may be implemented by hardware, firmware, software, or any combination thereof.

Power preference module 221 determines the UE preference for power saving or performance/normal operation, and then indicates such preference to the network with a prohibition mechanism. DRX/DTX module 222 handles DRX/DTX operation and state transition action based on configured DRX/DTX parameters. MSE and mapping module 223 estimates mobility state of the UE and then maps to speed information based on certain mapping rules. RRC release module 224 makes decision on whether long RRC inactivity time is preferred or not, and indicates such preference to the network for optimal RRC release time. Configuration module 225 receives various configurations including DRX parameters, prohibit timer, MSE mapping rule, and mobility management etc. from the network and operates accordingly.

Figure 3:
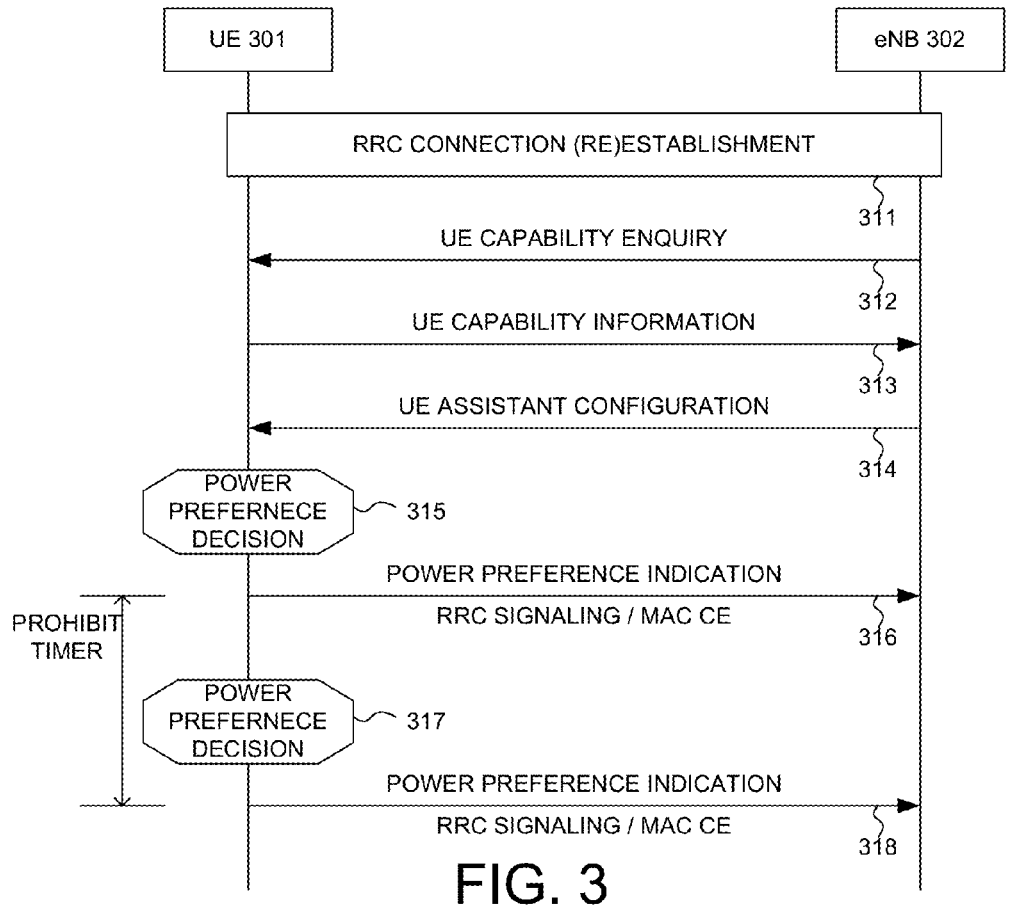
FIG. 3 illustrates one embodiment of UE reporting power preference indication to the network.

FIG. 3 illustrates one embodiment of UE reporting power preference indication to the network. In a mobile communication network, UE 301 first establishes or reestablishes an RRC connection with eNB 302 (step 311). In step 312, UE 301 receives a capability enquiry from eNB 302. In step 313, UE 301 transmits capability information to eNB 302. For example, UE 301 indicates that it supports power preference indication to the network. In step 313, UE 301 receives assistant configuration from eNB 302. For example, the assistant configuration may comprise an explicit prohibit time value (i.e., 64 ms, 128 ms, 640 ms) or a virtual time value (i.e., the number of consecutive drxCycle) to prevent from frequent indication from the UE. If number of consecutive drxCycle is used, short drxCycle and long drxCycle shall be taken into account together during the counting. The assistant configuration may comprise the maximum number of indications by the UE during a certain time window. The certain time window could be configured by eNB or could be a default value. Alternatively, eNB 302 may configure such information by broadcasting to UEs via System Information Block (SIB). The broadcasted value would be a default value and eNB may configure a UE-specific value for UE if needed.

After capability negotiation and configuration, UE 301 can start to report its power preference indication to eNB 302 when needed. In step 315, UE 301 makes a power preference decision. In step 316, UE 301 sends a power preference indication to eNB 302, which decides whether to make use of the power preference indication to reconfigure UE 301. UE 301 also starts a prohibit timer at step 316. Later on, in step 317, UE 301 makes another power preference decision. In step 318, upon expiry of the prohibit timer, UE 301 sends another power preference indication to eNB 302, which again decides whether to make use of the power preference indication to reconfigure UE 301. In one example, the power preference indication is sent via a new Information Element (IE) via RRC signaling. In another example, the power preference indication is sent via a new Media Access Control (MAC) Control Element (CE) using new LCID. In yet another example, the power preference indication is sent via legacy MAC CE with a reserved bit.

The UE preference of power saving or non-power saving would most likely be based on other power-saving features in the UE, e.g. the screen power saver. In a simple implementation, the UE would indicate preference for power saving as soon as the UE screen is in power-saving mode. In a slightly more sophisticated implementation, the UE could also take into account the application using the data connection and the state of that particular application. Thus, it is reasonable to assume that the UE could change its preference in the timeframe magnitudes of 1 s-100 s. Note that in case UE preference is based on UE power-saving features, it could be changed many times, e.g. based on user-application interaction, also when no data transmission in ongoing. It would be bad if the network reacted to such changes resulting in signaling both for UE preference indication and for network initiated reconfigurations without any positive effects when there is no data transmission. Moreover, the user attention to the UE and its application may not be perfectly reflected by the UE power-saving features. Quite often, the screen power saver goes on too early, and the user has to initiate some interaction to turn the screen back on again immediately. In such circumstance, a poorly implemented UE could generate two UE preference indications to the network, first one where the UE indicates a preference for power saving, and another indication where the UE indicates a preference for normal operation.

Therefore, to have an efficient mechanism, the UE indication of its power preference should be triggered more intelligently than just following the screen on/off. The network needs to use this information carefully, also considering other information, such as buffered data volumes etc. There is a risk that simple UE implementation will generate too many UE power preference indications, and there is a risk that simple network implementation will generate too many reconfigurations based on such UE power preference indications.

The simplest mechanism could be a mechanism that just limits the rate of preference indications, e.g. a prohibit timer, or a time window with a maximum number of indications. Such mechanism could be configurable in order to make it possible for the network to adapt its usage of this mechanism according to the level of sophistication of its algorithms. With such mechanism, UE is encouraged to indicate the most likely preference until the time UE can signal a change, to make possible smart UE implementations. For example, UE waits a short while after screen off to see if user turns the screen immediately back on again before sending any preference indication.

In accordance with one advantageous aspect, it is preferred that different prohibit mechanism is applied to "power-saving mode to normal mode" and "normal mode to power-saving mode". An indication of power-saving mode to eNB could make eNB reconfigure the UE for better power performance. Such indication, however, may not meet the QoS requirement of the application, i.e. increased delay. If UE delays such indication, the consequence is less power saving, but it does not harm user experience. On the other hand, a delay on the indication of returning to normal mode may harm user experience. Therefore, an asymmetric level of prohibition is preferred.

Figure 4:
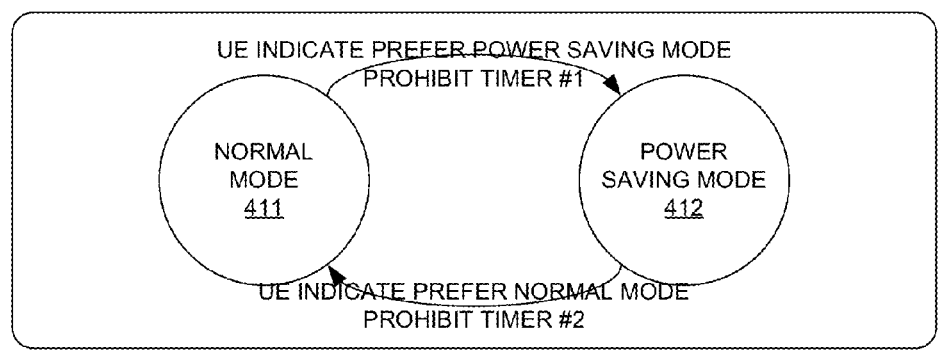
FIG. 4 illustrates a prohibition mechanism that is used for reporting power preference indication.

FIG. 4 illustrates an asymmetric prohibition mechanism that is used by a UE for reporting power preference indication. The UE has two operation modes: a normal mode 411 and a power-saving mode 412. In normal mode 411, if the UE determines that it prefers power-saving mode, then the UE indicates such preference to the network if a first prohibit timer #1 has expired. In power-saving mode, if the UE determines that it prefers normal mode, then the UE indicates such preference to the network if a second prohibit timer #2 has expired. In the example of FIG. 4, timer #1 is longer than timer #2, because delaying indication of power-saving preference does not harm user experience. In one specific example, timer #2=zero (0) or even eNB does not give any configuration on the timer #2, meaning that the UE is not prohibited to indicates its preference of returning to normal mode, since such delay may harm user experience. The timer might be re-initiated when UE receives any MAC-MainConfig containing new DRX parameters or a new prohibit timer, or when the preference was sent. When HO happens, the source eNB shall forward the UE preference information to the target eNB. The forwarding includes the UE capability on preference reporting, the prohibit timer setting, and the current UE preference state. After the forwarding, the target eNB may pre-configure those settings during HO preparation.

Figure 5:
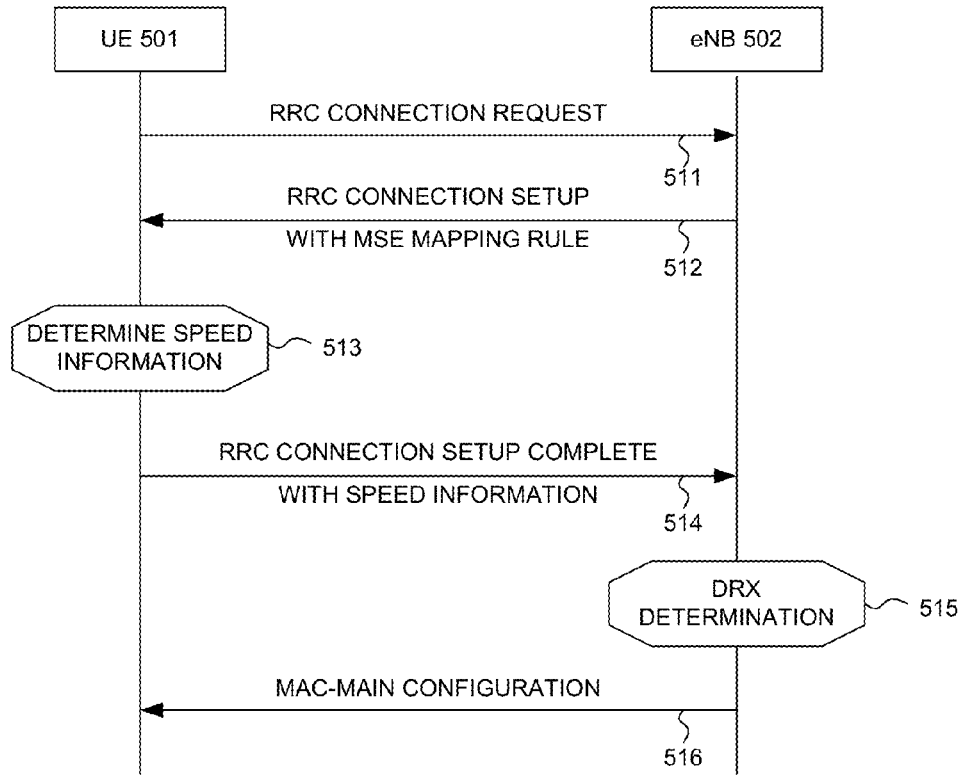
FIG. 5 illustrates one embodiment of UE reporting speed information to the network.

Besides power saving preference, another useful UE information is UE speed information. FIG. 5 illustrates one embodiment of UE reporting speed information to the network. In a mobile communication network, UE 501 tries to establish an RRC connection with base station eNB 502. In step 511, UE 501 transmits an RRC connection request to eNB 502. In step 512, UE 501 receives an RRC connection setup from eNB 502. In one example, the RRC connection setup comprises a mapping rule for determining speed information. In step 513, UE 501 determines the UE speed information, e.g., based on the received mapping rule. In step 514, UE 501 transmits an RRC connection setup complete message to eNB 502. The RRC connection setup complete message comprises the UE speed information. In step 515, based on the UE speed information, eNB 502 determines new DRX parameters. Finally, in step 516, eNB 502 transmits a MAC-MainConfig to UE 501 to configure the determined DRX parameters.

UE speed information is typically represented by MSE (mobility state estimation). It is known that MSE categorizes UE speed into normal/medium/high three mobility states by counting the HO/cell reselection amounts, e.g., cell change counts. The number of mobility states may require different reporting bits and be a serious concern if the reporting is carried in RRC Connection Setup Complete. To carry the information in the RRC Connection Setup Complete message could immediately support the feature when UE goes back to RRC Connected state. The reason to append the speed information during RRC connection establishment is eNB could avoid configuring long drxCycle for high speed UE and consequently prevent radio link failure (RLF). Oppositely, UE does not need to report that information during RRC Connected State. The eNB may know UE's mobility state by Doppler shift or performing similar counting on the HO and cell selection. An eNB may broadcast its capability of receiving speed information and making proper configuration in its system information. The UE may not need to report speed information if the eNB does not support the feature. The eNB may use broadcast information to specify whether it supports the speed reporting, and may include the mapping criteria on the speed state. After receiving the speed information from UE, either UE could update its speed when UE is in RRC Connected state or eNB could update the speed by itself.

From MSE, the applying DRX configuration and RRC transition setting for those three mobility states are as follow: High mobility may use short DRX cycle or short release time. Normal mobility may use long DRX cycle or long release time. For medium mobility, the relationship with those settings are not very clear, thus reporting may be invalid if eNB may not know how to set a proper parameter. As a result, it is good to have two speed levels only during speed information reporting. There may require a scheme to perform mapping between MSE information and two-level speed information reporting. The benefit of two-level reporting is that one bit is enough for the reporting. To support two-level reporting, the problem is determining medium mobility state to a corresponding reporting state. Various MSE mapping mechanisms are proposed to map the three MSE mobility states to the two-level speed information.

Figure 6:
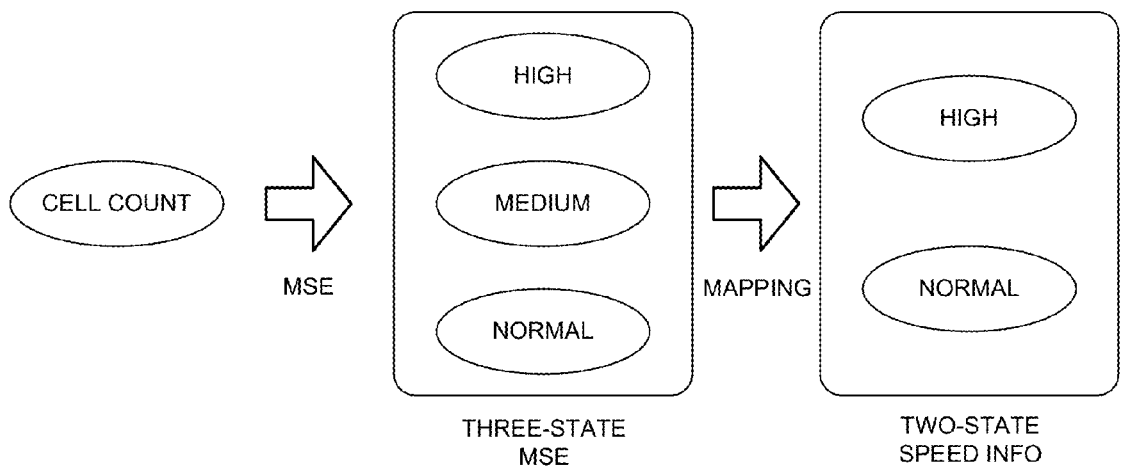
FIG. 6 illustrates an MSE mapping mechanism that is used for reporting speed information.

FIG. 6 illustrates an MSE mapping mechanism that is used for reporting speed information. As illustrated in FIG. 6, a UE first counts the HO/cell reselection amounts during predefined time windows. Based on the cell change counts, the UE then performs MSE and determines normal/medium/high three mobility states. The UE then performs MSE mapping and maps the three MSE mobility states into normal/high two speed levels for speed information reporting. In a first embodiment, the UE decides the mapping based on internal UE-implementation. In a second embodiment, eNB defines the mapping rule and explicitly configures the mapping rule via RRC message or SIB. For example, eNB may decide both normal and medium mobility states would be mapped to normal speed upon reporting. Alternatively, the mapping rule could be appended in RadioResourceConfigDedicated where one bit is used to indicate the medium mobility state to map into high/normal speed state during reporting. In a third embodiment, eNB defines a new threshold for UE to determine the normal/high two speed levels directly based on cell change counts. If the counting is larger than the threshold, then the UE reports high speed. Otherwise, the UE reports normal speed. The specified new threshold is independent from the legacy two thresholds for MSE (n-CellChangeHigh, n-CellChangeMedium). In a fourth embodiment, an implicit mapping is performed by reading concurrent system information (i.e., cell type/size, RNTP). For example, if the camped cell is a Macrocell, mapping medium mobility state to normal speed. If the camped cell is a Picocell, mapping medium mobility state to high speed. This is because Picocell might have small coverage and RLF may occur easily, and indicating high speed to have short DRX Cycle/release time is more proper.

In addition to DRX configuration, the transition from the RRC Connected state to RRC IDLE state is also controlled by the network. The main purpose to transit into RRC IDLE state is for power saving. However, the RRC state transition incurs large signaling overhead. Furthermore, frequent RRC state changes may also impose significant more use of system resource, resulting in increased signaling overhead in the network. For some application traffic, the current RRC state transition design may counteract the power saving and/or system efficiency. One objective for UE to report speed information is to assist eNB to decide whether it is better to keep the UE in RRC Connected longer or to release it to RRC IDLE shortly after buffer become empty. In other words, to assist eNB to decide the length of the RRC inactivity timer that is used to control how long the UE will be released to RRC IDLE after the belonged buffer is empty. However, it is insufficient to decide the RRC inactivity timer based on speed information only. Instead of reporting speed information only, it is proposed that UE can report additional assistance information to assist efficient RRC state transition.

Figure 7:
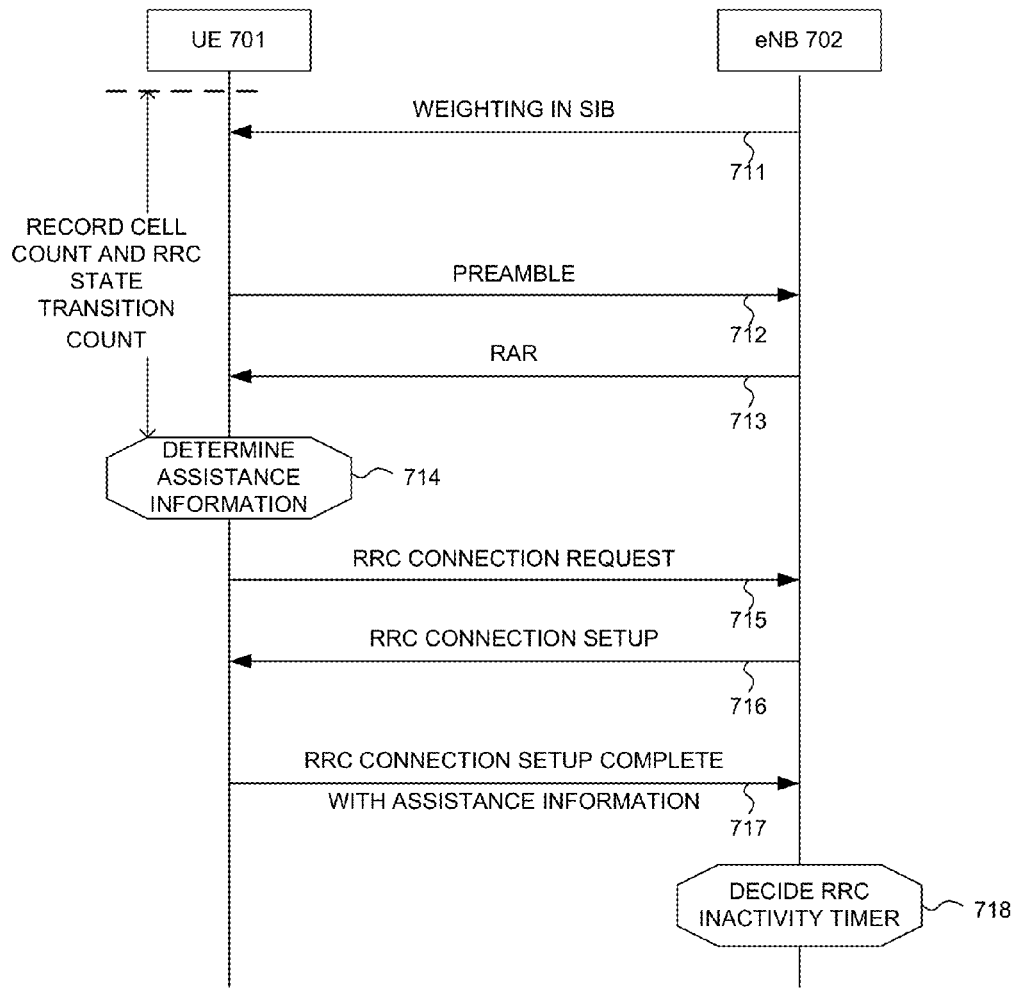
FIG. 7 illustrates UE reporting RRC release assistance information.

FIG. 7 illustrates embodiments of UE reporting RRC release assistance information to the network. In step 711, UE 701 receives configuration information from eNB 702. For example, the configuration information comprises weighting values broadcasted via SIB. In step 712, UE 701 sends a preamble for random access to eNB 702, and receives a random access reply (RAR) from eNB 702 in step 713. During a specific time window, UE 701 counts both the amount of cell reselection/HO and the amount of RRC state transition. During the time window, if the UE goes into RRC Connected, then the cell selection counts are continued and used as HO count instead. A pair of RRC connection setup and release would be counted as one for RRC state transition. In step 714, UE 701 determines RRC release assistance information based on both cell change counts and RRC state transition counts. In step 715, UE 701 starts to establish RRC connection by sending an RRC connection request to eNB 702. In step 716, eNB 702 sends an RRC connection setup back to UE 701. In step 717, UE 701 sends an RRC connection setup complete message to eNB 702. The RRC connection setup complete message comprises the RRC release assistance information determined in step 714. Finally, in step 718, eNB 702 decides the RRC inactivity timer based on the received assistance information. In general, eNB 702 will either keep UE 701 in RRC Connected or release UE to IDLE, which ever has lower signaling overhead.

In a first embodiment, the assistance information comprises both the cell change counts and RRC transition counts. UE 701 counts both the amount of cell reselection/HO and RRC state transition for a specific period (e.g. within 5 minute) before sending the RRC connection setup complete message. In step 714, UE simply records the cell change counts and RRC state transition and leave the actual decision to eNB. When establishing RRC connections, UE 701 then indicates both amount values to eNB 702 in step 717, and eNB 702 evaluates the potential overhead of keeping UE in Connected mode or releasing it to IDLE in step 718. For example: the overall RRC Setup and Release signaling overhead is 11 messages, and the overall HO signaling overhead is seven messages. When receiving the cell selection amount is five and RRC state transition is six, the rough overhead to keep UE in RRC Connected is 5×7=35 messages; the rough overhead to leave UE to IDLE is 6×11=66 messages. As a result, eNB may use longer RRC inactivity timer to keep UE in RRC Connected since it could avoid additional overhead.

In a second embodiment, the assistance information comprises an overhead indication determined by UE 701 in step 714. That is, the evaluation and comparisons of signaling overhead is performed by UE and UE only reports an overhead indication on whether to keep the UE in RRC Connected or release the UE to IDLE. For example, the overhead indication could be one bit while '1' means larger overhead when keeping in RRC Connected and '0' means larger overhead when leaving to RRC IDLE. When eNB 702 receives overhead indicator "0", it may use long RRC inactivity timer, otherwise it may use short RRC inactivity timer. During comparison, a default weighting may be used to calculate the overhead. The default weighting could be (11/7=1.56) for state transition and UE may multiple it with RRC state transition count and then compare with cell change count. Alternatively, eNB may broadcast an adopted weighting within its coverage. In that way, eNB may respectively take their capability or loading into account and determine the weighting to enable more or less connected UEs. For example, a powerful eNB could support more connected UEs, and the eNB may use small weighting to let UE stayed in RRC Connected.

The reporting of UE preference, speed information, and other assistance information is independent. When eNB receives the information, eNB may evaluate concurrent buffer status, loading, and network situation to make adaptions. The possible adaptation include that eNB may extend or shorten DRX cycle and/or release time based on receiving corresponding constructs. For example, high speed UE prefers short DRX cycle, normal speed UE prefers long release time, normal power UE prefers long DRX cycle, high speed and low power UE prefers short release time, normal speed and low power UE prefers long DRX cycle and long release time, and high speed and normal power UE prefers short DRX cycle.

Figure 8:
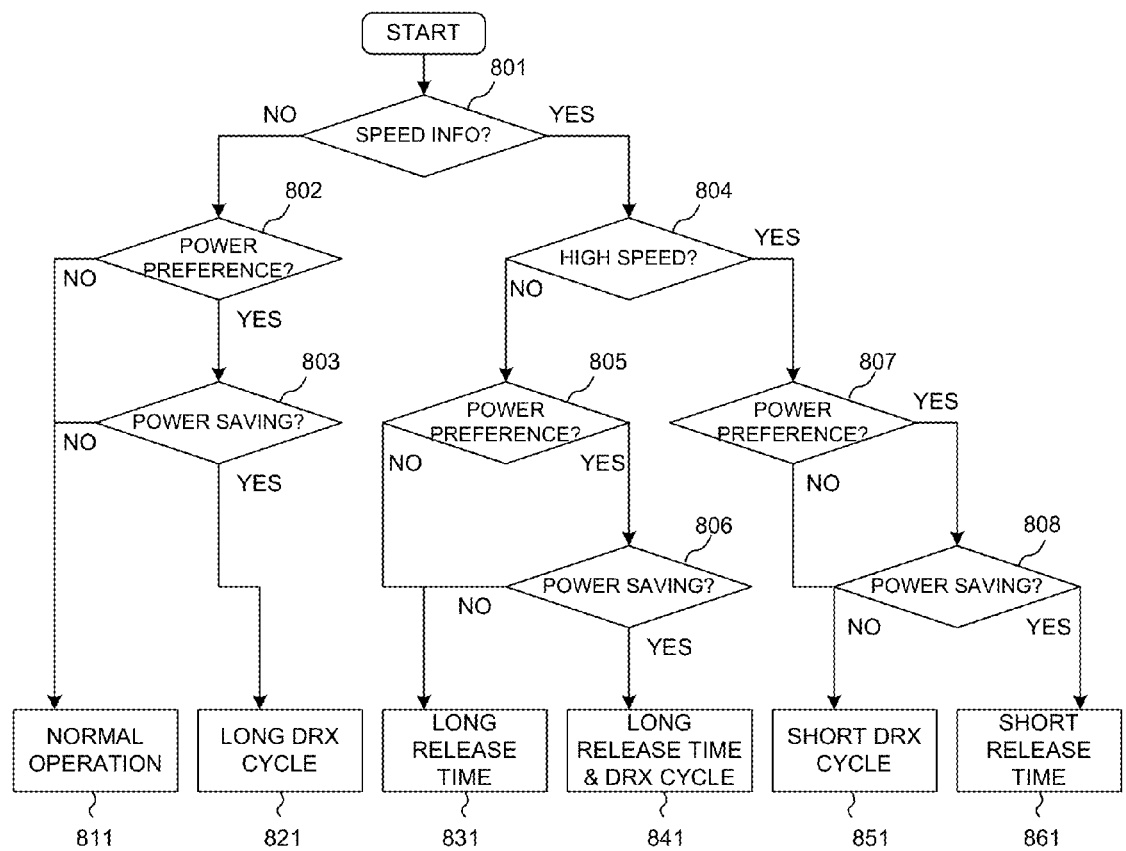
FIG. 8 is a diagram of eNB configuration after receiving UE information.

FIG. 8 is a diagram of eNB configuration after receiving UE assistance information. In step 801, eNB checks whether speed information is supported. If no, then eNB further checks if power preference indication is supported in step 802. If no, then eNB applies normal operation in step 811; if yes, then eNB further checks whether power saving is preferred in step 803. If no, then eNB applies normal operation; if yes, then eNB applies long DRX cycle in step 821. On the other hand, if speed information is supported, then eNB further checks whether UE is in high speed in step 804. If UE is not in high speed, then in step 805, eNB checks whether power preference indication is supported. If no, then eNB applies long release time in step 831. If yes, then eNB further checks whether UE prefers power saving mode in step 806. If no, then eNB applies long release time; if yes, then eNB applies long release time and long DRX cycle in step 841. On the other hand, if UE is in high speed, then in step 807, eNB checks whether power preference indication is supported. If no, then eNB applies short DRX cycle in step 851. If yes, then eNB further checks whether UE prefers power saving mode in step 808. If no, then eNB applies short DRX cycle; if yes, then eNB applies short release time in step 861.

Figure 9:
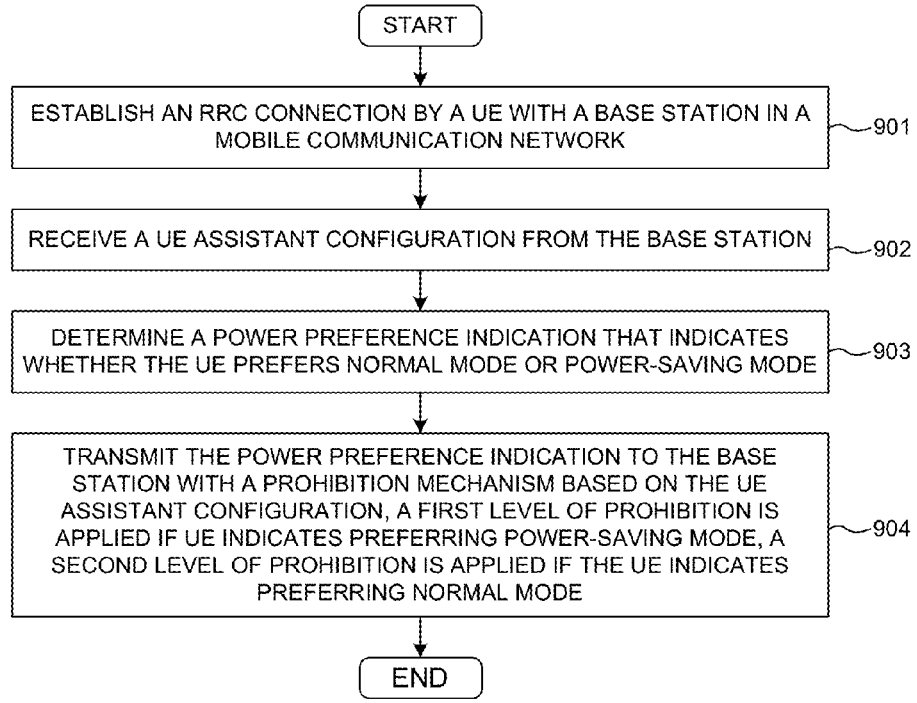
FIG. 9 is a flow chart of a method of UE reporting power preference indication in accordance with one novel aspect.

FIG. 9 is a flow chart of a method of UE reporting power preference indication in accordance with one novel aspect. In step 911, a UE establishes an RRC connection with a base station in a mobile communication network. In step 902, the UE receives a UE assistance configuration from the network. The UE assistance configuration may comprise an explicit prohibit timer value. In step 903, the UE determines a power preference indication that indicates whether the UE prefers normal mode or power-saving mode. In step 904, the UE transmits the power preference indication to the network with a prohibition mechanism based on the UE assistance configuration. A first level of prohibition (e.g., a longer prohibit timer) is applied if the UE indicates preferring power-saving mode, and a second level of prohibition (e.g., a shorter prohibit timer) is applied if the UE indicates preferring normal mode. In one specific example, the shorter prohibit timer is zero (0), so that the UE is not prohibited for indicating normal mode preference.

Figure 10:
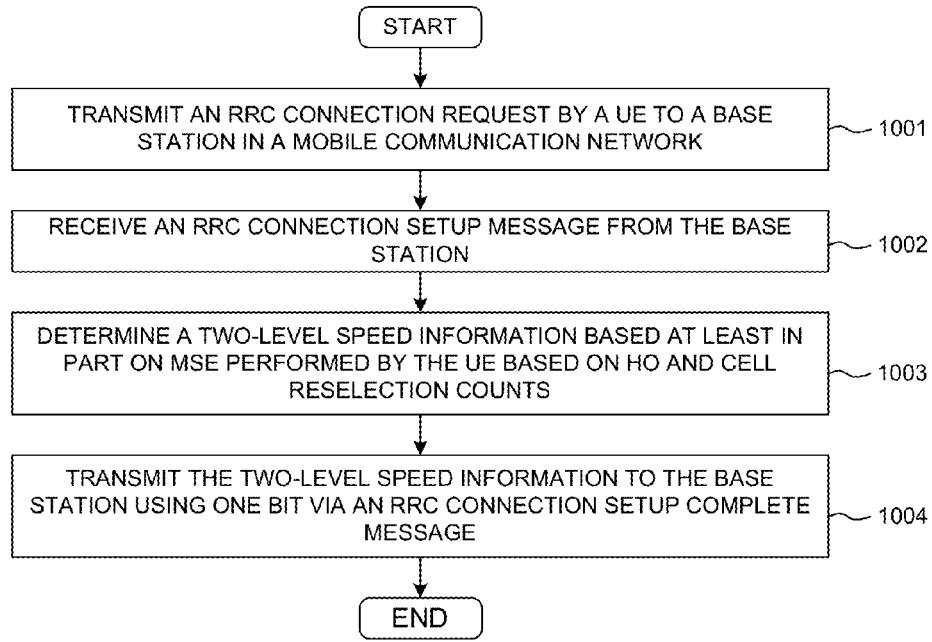
FIG. 10 is a flow chart of a method of UE reporting speed information in accordance with one novel aspect.

FIG. 10 is a flow chart of a method of UE reporting speed information in accordance with one novel aspect. In step 1001, a UE transmits an RRC connection request to a base station in a mobile communication network. In step 1002, the UE receives an RRC connection setup message from the base station. The RRC connection setup message may comprise a mapping rule. In step 1003, the UE determines a two-level speed information based on MSE performed by the UE based on HO and cell reselection counts. In one embodiment, the MSE categorizes UE speed into normal, medium, and high three mobility states, and the UE maps the three mobility states into normal and high two-level speed information based on the mapping rule. In step 1004, the UE transmits the two-level speed information to the base station using one bit via an RRC connection setup complete message.

Figure 11:
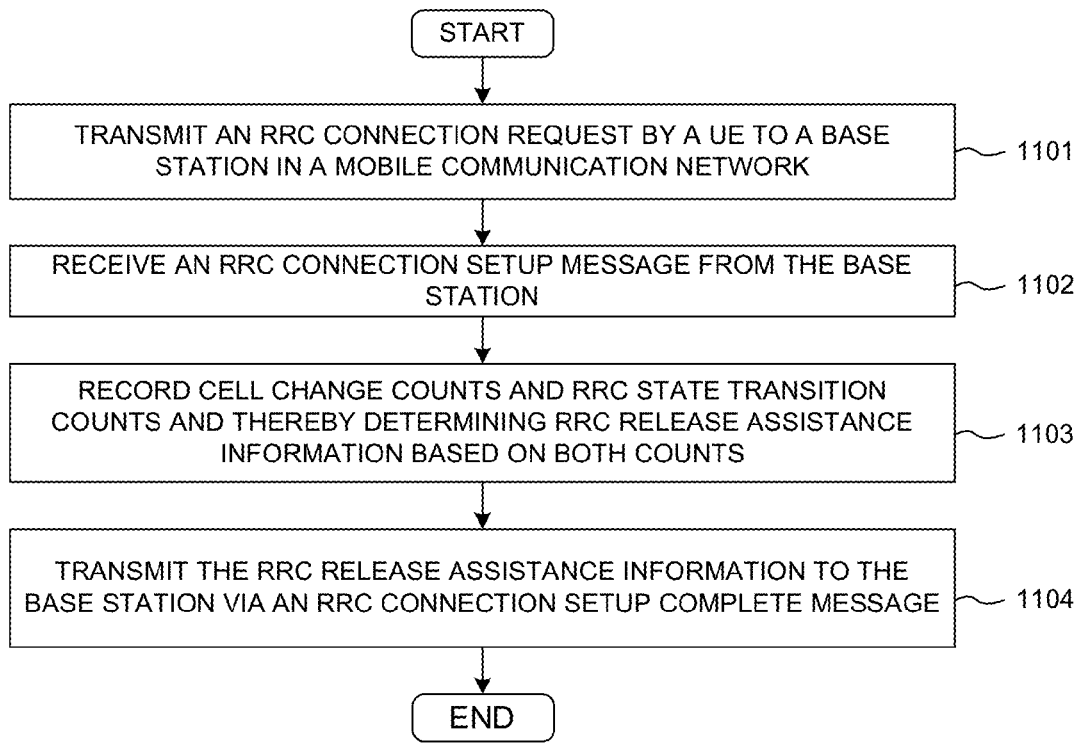
FIG. 11 is a flow chart of a method of UE reporting RRC inactivity time indication in accordance with one novel aspect.

FIG. 11 is a flow chart of a method of UE reporting RRC inactivity time indication in accordance with one novel aspect. In step 1101, a UE transmits an RRC connection setup request to a base station in a mobile communication network. In step 1102, the UE receives an RRC connection setup message from the base station. The RRC connection setup message may comprise a weighting factor. In step 1103, the UE records both cell change counts and RRC state transition counts and thereby determining RRC release assistance information based on both counts. In step 1104, the UE transmits the RRC release assistance information to the base station via an RRC connection setup complete message. In a first embodiment, the assistance information comprises both the cell change count and the RRC state transition count, so that eNB decides on whether to keep the UE in RRC Connected to release the UE to IDLE based on both counts. In a second embodiment, the UE makes evaluation based on both counts, and the assistance information comprises a one-bit overhead indication on whether to keep the UE in RRC Connected or release the UE to IDLE. Because the signaling overhead for RRC Setup/Release and HO are different, using both counts, the RRC inactivity time is determined to reduce overall signaling overhead.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    establishing a radio resource control (RRC) connection by a user equipment (UE) with a base station in a mobile communication network;
    indicating to the base station whether the UE supports a power preference indication (PPI) feature using a capability negotiation procedure, wherein the UE reports one or more supported features using the capability negotiation procedure after the RRC establishment;
    receiving a UE assistant configuration from the base station, wherein the UE assistance configuration configures one or more PPI related parameters if the UE indicated the PPI feature is supported;
    determining a power preference indication that indicates whether the UE prefers a normal mode or a power-saving mode if the PPI feature is supported; and
    transmitting the power preference indication to the base station with a two-level prohibition mechanism based on the UE assistant configuration, wherein a first level of prohibition is applied if the UE while in the normal mode indicates preferring the power-saving mode, and a second level of prohibition is applied if the UE while in the power-saving mode indicates preferring the normal mode, and wherein the first level of prohibition is different from the second level of prohibition.

2. The method of claim 1, wherein the prohibition mechanism involves a prohibit timer, wherein the first level of prohibition involves a longer timer, and wherein the second level of prohibition involves a shorter timer.

3. The method of claim 2, wherein the UE assistance configuration comprises the prohibit timer value.

4. The method of claim 2, wherein the shorter timer is equal to zero such that the UE indicates preferring normal mode without any prohibition.

5. The method of claim 1, wherein the prohibition mechanism involves a maximum number of indications during a time window.

6. The method of claim 1, wherein the power preference indication is sent via a new Information Element (IE) via RRC signaling.

7. The method of claim 1, wherein the power preference indication is triggered based on at least one of: power saving features of the UE, applications running on the UE, and UE-buffered data volumes.

8. A user equipment (UE) comprising:
    a transceiver that establishes a radio resource control (RRC) connection with a base station in a mobile communication network and receives a UE assistant configuration from the base station;
    a power preference handler that indicates to the base station whether the UE supports a power preference indication (PPI) feature using a capability negotiation procedure, wherein the UE reports one or more supported features using the capability negotiation procedure after the RRC establishment, receives a UE assistant configuration from the base station, wherein the UE assistance configuration configures one or more PPI related parameters if the UE indicated the PPI feature is supported, determines a power preference indication that indicates whether the UE prefers a normal mode or a power-saving mode if the PPI feature is supported, and performs a two-level prohibition mechanism to transmit the power preference indication to the base station based on the UE assistant configuration, wherein a first level of prohibition is applied if the UE while in the normal mode indicates preferring the power-saving mode, and a second level of prohibition is applied if the UE while in the power-saving mode indicates preferring the normal mode, and wherein the first level of prohibition is different from the second level of prohibition.

9. The UE of claim 8, wherein the prohibition mechanism involves a prohibit timer, wherein the first level or prohibition involves a longer timer, and wherein the second level of prohibition involves a shorter timer.

10. The UE of claim 8, wherein the UE assistance configuration comprises the prohibit timer value.

11. The UE of claim 8, wherein the shorter timer is equal to zero such that the UE indicates preferring normal mode without any prohibition.

12. The UE of claim 8, wherein the prohibition mechanism involves a maximum number of indications during a time window.

13. The UE of claim 8, wherein the power preference indication is sent via a new Information Element (IE) via RRC signaling.

14. The UE of claim 8, wherein the power preference indication is triggered based on at least one of: power saving features of the UE, applications running on the UE, and UE-buffered data volumes.

* * * * *